H. COLE.
MOTOR CAR AND OTHER LAMP.
APPLICATION FILED JULY 15, 1908.

917,844.

Patented Apr. 13, 1909.
4 SHEETS—SHEET 1.

Witnesses:-
C. H. Crawford
L. Lang

Inventor:-
Harry Cole
by B. Singer
Attorney

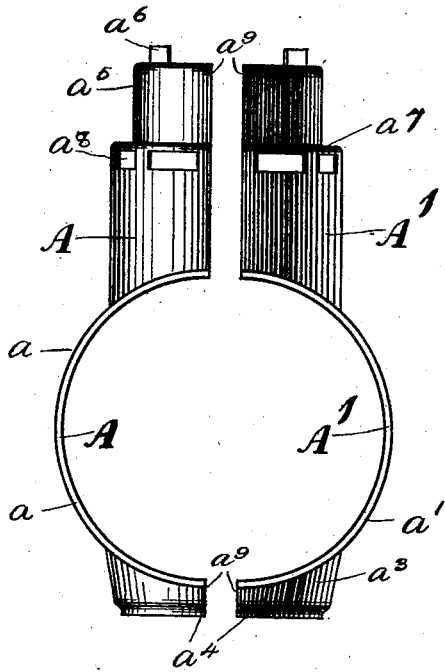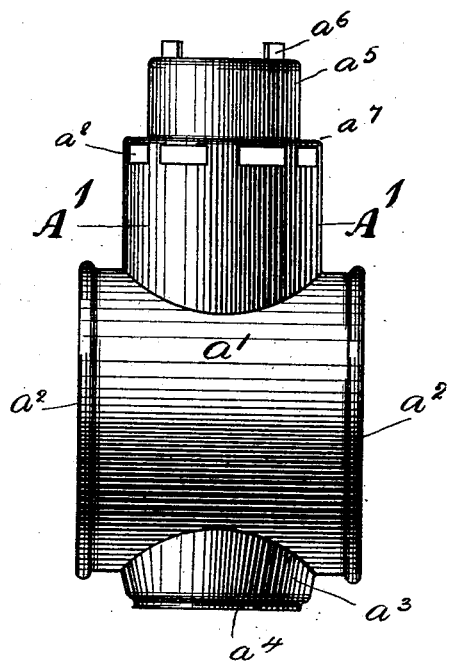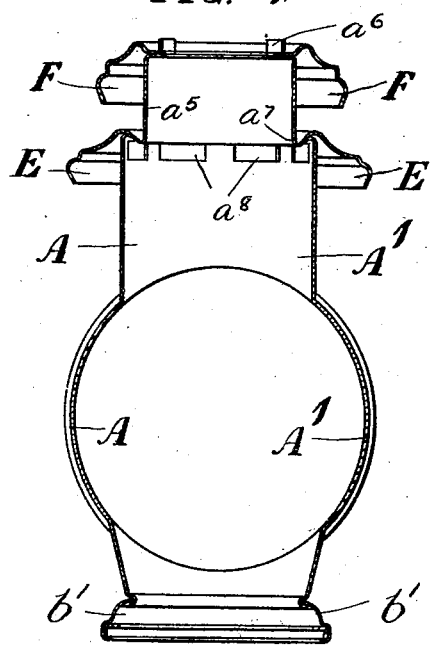

H. COLE.
MOTOR CAR AND OTHER LAMP.
APPLICATION FILED JULY 15, 1908.
917,844.
Patented Apr. 13, 1909.
4 SHEETS—SHEET 3.
FIG. 17
FIG. 16
FIG. 15
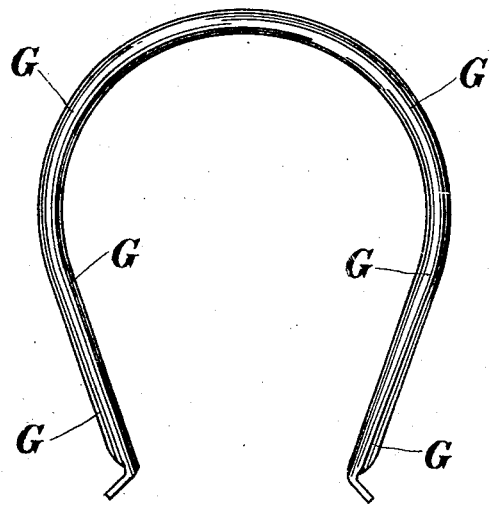
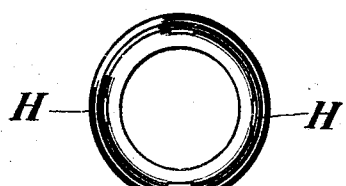
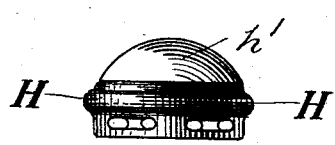
FIG. 7
FIG. 8
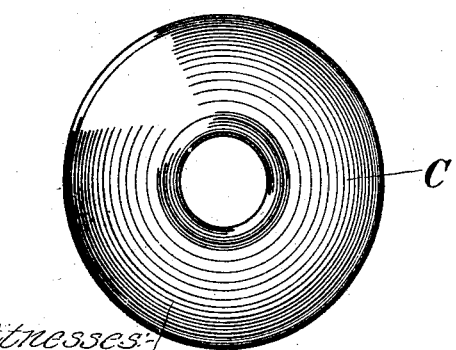
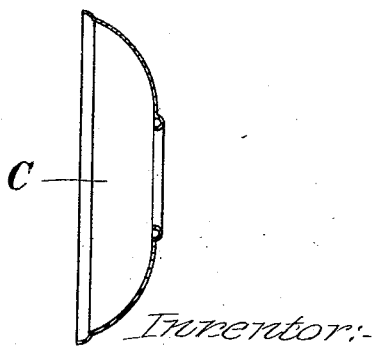
Witnesses:
C. M. Crawford
L. Lang
Inventor:-
Harry Cole
by B. Singer
Attorney

H. COLE.
MOTOR CAR AND OTHER LAMP.
APPLICATION FILED JULY 15, 1908.

917,844.

Patented Apr. 13, 1909.
4 SHEETS—SHEET 4.

Witnesses:
C. H. Crawford
L. Lang

Inventor:
Harry Cole
by B. Singer
Attorney

THE NORRIS PETERS CO., WASHINGTON, D. C.

UNITED STATES PATENT OFFICE.

HARRY COLE, OF ERDINGTON, JUXTA BIRMINGHAM, ENGLAND.

MOTOR-CAR AND OTHER LAMP.

No. 917,844.  Specification of Letters Patent.  Patented April 13, 1909.

Application filed July 15, 1908. Serial No. 443,630.

*To all whom it may concern:*

Be it known that I, HARRY COLE, a subject of the King of Great Britain, residing at "Woodstock," Chester Road, Erdington, juxta Birmingham, in the county of Warwick, England, manager, have invented certain new and useful Improvements in Motor-Car and other Lamps; and I do hereby declare the following to be a full, clear, and exact description of the same.

This invention comprises improvements in the manufacture of motor car and other lamps, and has for its object to provide a method of manufacture which shall very materially cheapen the process without impairing the quality and finish of the product.

The invention also consists in the product resulting from the method.

In order that the invention may be thoroughly understood and easily carried into practical effect, I have appended hereunto four sheets of drawings illustrating the invention.

Figure 1:
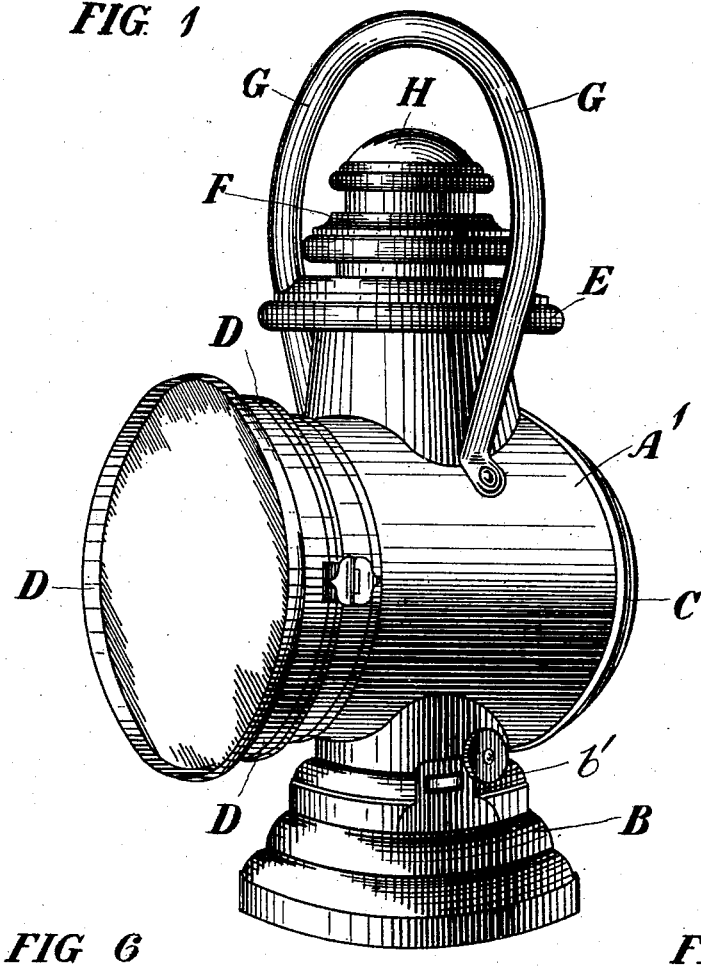
Figure 6:
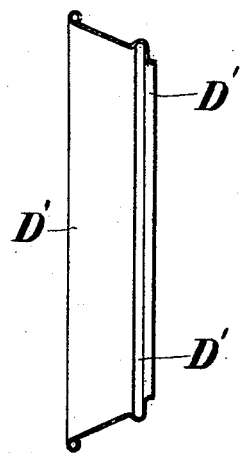
Figure 5:
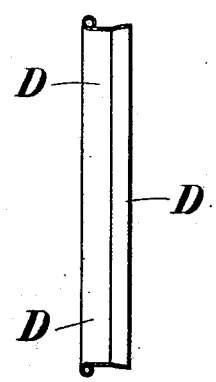
Figure 11:
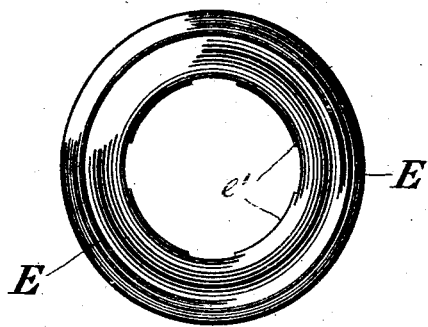
Figure 12:
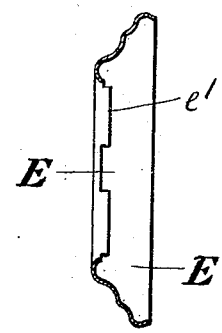
Figure 13:
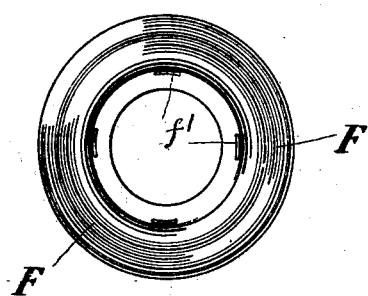
Figure 14:
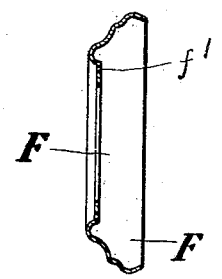
Figure 9:
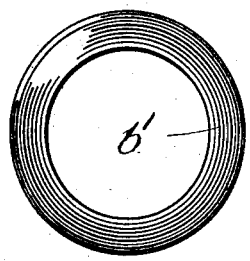
Figure 10:
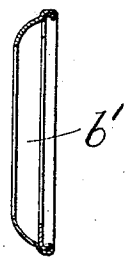

Figure 1. is a general view of the lamp complete. Fig. 2. is a front view of the two parts pressed for forming the body. Fig. 3. is a side view of one of same. Fig. 4. is a sectional view of the lamp without the oil container. Fig. 5. is a sectional detail of the ring for carrying the hinged glass bell on the lamp front. Fig. 6. is a similar view of the glass carrying bell. Fig. 7. is an elevation of the back plate. Fig 8. is a section of same. Fig. 9. is an elevation of the bottom securing ring. Fig. 10 is a section of same. Fig. 11 is an elevation, and Fig. 12 a section of the bottom "frill" of the lamp top. Fig. 13 and Fig. 14 are similar views of the upper "frill" of the top. Fig. 15 is the top cap of the lamp and Fig. 16 is the ring for mounting the same. Fig. 17 is the lamp handle or "bail".

Hitherto although there have been various methods of pressing portions of such lamps it has been invariably the custom, where an effort is made to make the body of as few pieces as possible, to press or draw the main or middle portion of the body from a single disk. This as will be readily understood is a very costly process entailing several operations of the disks.

Now in accordance with my invention I intend forming not only the central horizontal cylindrical portion of the lamp body but also the upper and lower extensions or neck flanges to which the other parts may be secured from two metal blanks. These are not required to be pressed to anything like the depths of the case mentioned as I divide the body down the vertical axis so that two comparatively shallow pressings are required.

The edges of the pressed portions are formed with small flanges at the front and back. At the front to receive the extension or mouth to which the glass bell is hinged and at the back to receive a separate back piece of pressed ornamental form. The edges of the neck at the top and the extension at the bottom are similarly provided with upset flanges, and to these ventilating top frills and the container in the case of oil lamps are respectively secured. The edges of the top and of the ring for securing the container which correspond to and are to be secured to the said flanges of the body are formed and inturned shoulders and when slipped onto the body the flanges of the latter can be pressed or lipped over same to effect a tight joint. The top frills and the container may be readily pressed. Similar connections can be made between the body and the back plate and the bell mouth, or in any of these connections riveting or like method may take the place of the locking flanges.

In constructing the lamp after the body has been formed in the special way mentioned and the other parts have been suitably made, the two pressed halves are brought together and firmly secured in place by the top and bottom ring. Then the remaining meeting edges may be brazed together or otherwise secured, and afterward the back and the bell mouth are secured in place. In some cases where needed as in the case of pivoting bails, projecting surfaces or bosses may be pressed in the halves of the neck at the top of the body and in any case when desired the back instead of being separate may be formed by the two pressed halves of the body. This method of construction produces a lamp body of even strength throughout; the body neck and bottom of the lamp being in two pieces of metal only, brazed together, obviating the necessity of numerous riveted or soldered junctions and effectively removes the possibility of the lamp shaking to pieces or becoming loose at the joints under wear. The previous methods employed entailing spinning or drawing necessitate the stretching of the metal to such an extent that the back portion of the lamp is greatly reduced in thickness and strength. In this invention the whole of the lamp is of an even gage of metal and as annealing is not necessary the original strength of the metal is maintained. Further, the back frills and top form additional strengthening bands instead of, as in the older methods, constituting weak points to be reinforced by soldering or rivets.

In accordance with this invention I press in suitable dies the two parts A A'; these comprise the central body part of the lamp with the portion at the top for conveying away the fumes and also the portion at the bottom which forms the connection of the container in the case of an oil lamp. These two portions A A' are at the front and rear edges of the semi-cylindrical portions $a$, $a'$ pressed with a lip $a^2$ and at the lower edge of the bottom boss $a^3$ they are each provided with a lip $a^4$. The top $a^5$ is provided with tongues $a^6$ and at the shoulder $a^7$ perforations are formed, both provisions being used for the purpose of connecting the top frills which prevent down draft through the outlets $a^8$ and are of an ornamental character.

The two parts A A' are brought together over a former and clamped in that position in a manner that insures their being effectually held true during securing of the halves. For securing the halves A A', the bottom ring $b^1$ to which the container B for the fuel is secured in the complete lamp, is passed over the lip $a^4$ at the bottom of the two halves and the lip is spun out under the same as shown in Fig. 4. The back plate C shown at Figs. 7 and 8 is similarly secured to the lip $a^2$ at the back of the cylindrical part $a'$ serving further to hold the two halves together while the ring D (Fig. 5) is secured to the lip $a^2$ at the front ready for the reception of the hinged glass carrying bell D', Fig. 6. These rings very securely tie the two halves A A' together, but I further secure them by brazing the meeting edges $a^9$, this making a very rigid and secure lamp body. For the top frills the pressed parts shown at Figs. 11 to 14 inclusive may be employed, the ring E seating on the shoulder $a^7$ with the tongues $e'$ projecting through and folded under slots in the part $a^7$. The ring F is mounted on the top $a^5$, the tongues $a^6$ of the latter passing through the slots $f'$ of the ring and also through ring H for securing that and the top $h'$ firmly in place. The bail G is shown for riveting in place and is of ordinary construction.

With the lamp body in addition to the advantages gained in strength and in the absence of shake or rattle in use, the appearance of the body is vastly improved on account of the absence of the edges of the metal at the top and bottom of the body where the necks join the cylindrical parts. Under the present process these parts come up sharp and clear and a much more shapely and neat lamp body is the result.

What I claim then is:

1. As an article of manufacture, a lamp including two blanks shaped to form a centrally enlarged body portion and extensions projecting therefrom, and rings embracing said extensions to connect said blanks and form a united structure, the abutting edges of said blanks being brazed.

2. As an article of manufacture, a lamp including two vertical blanks shaped to form the lamp body and having vertical abutting edges, said blanks having projections extending therefrom and having the abutting margins brazed, and rings embracing said extensions to form a united structure.

In testimony whereof, I have signed my name to this specification in the presence of two subscribing witnesses.

HARRY COLE.

Witnesses:
   F. GILBERT BRETELL,
   STANLEY BANNER.